June 25, 1946.　　　S. W. NEDELA　　　2,402,658
MACHINE GUIDE ATTACHMENT FOR SCALES
Filed Nov. 3, 1943
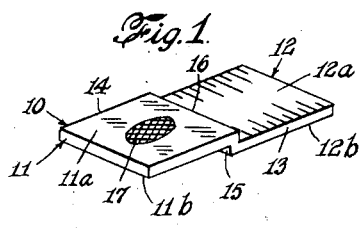
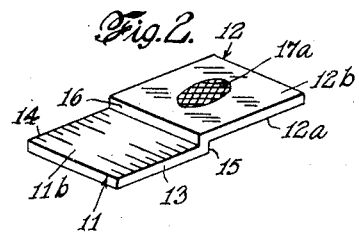
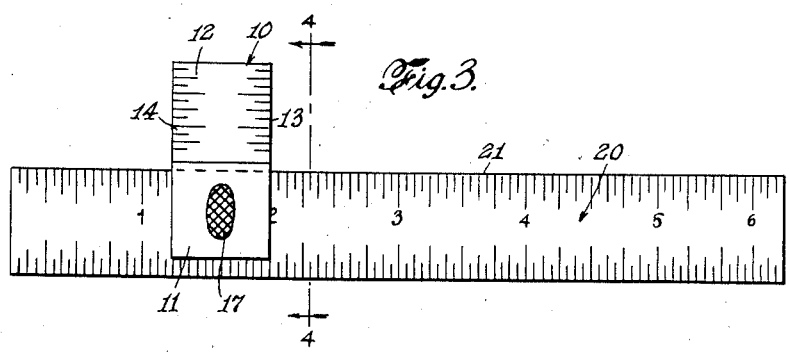
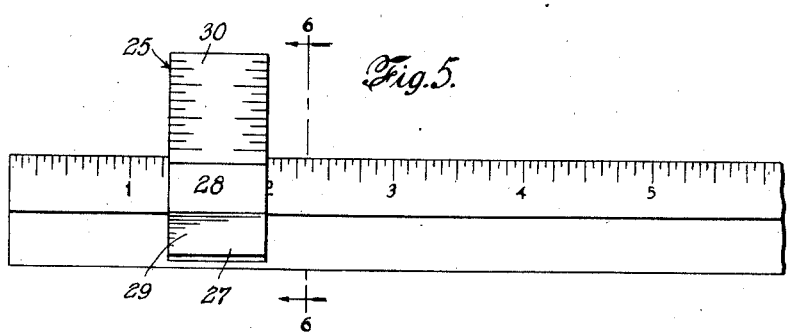
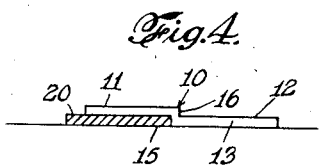
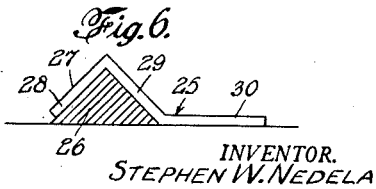
INVENTOR.
STEPHEN W. NEDELA
BY Carl Miller
ATTORNEY.

Patented June 25, 1946

2,402,658

UNITED STATES PATENT OFFICE 2,402,658

MACHINE GUIDE ATTACHMENT FOR SCALES

Stephen W. Nedela, Flint, Mich.

Application November 3, 1943, Serial No. 508,793

2 Claims. (Cl. 33—107)

This invention relates to measuring devices and more particularly to a scale attachment guide for use on a mesuring scale or ruler.

It is the principal object of this invention to provide for use with a lineal measuring scale such as that employed by machinists, draftsmen, architects and others, a measuring guide designed to be moved across the face of the scale to any selected scale division thereon to facilitate the accurate transfer of the same to the work, the measuring guide including a portion movable across the face of the scale and an integral portion movable across the face of the work, both portions being of the same width and providing parallel edges normal to the edge of the scale.

A further object of this invention is to so construct the measuring guide that the same may be operatively associated with a scale without requiring any structural modification in the form thereof.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein—

Figure 1 is a perspective view of the improved scale measuring guide.

Figure 2 is a perspective view of the reverse side of the measuring guide of Figure 1.

Figure 3 is a plan view showing the measuring guide of Figure 1 operatively associated with a flat scale.

Figure 4 is a sectional view taken on line 4—4, Figure 3.

Figure 5 is a plan view showing a modified form of measuring guide operatively associated with a triangular scale.

Figure 6 is a sectional view taken on line 5—5, Figure 5.

Referring to the drawing in detail, 10 denotes the measuring guide which may be formed of any suitable material such as plastic, metal, etc., and comprises a scale seating portion 11 and a guide measuring portion 12. Both the scale seating portion 11 and guide measuring portion 12 are integrally joined and are of the same width defining parallel edges 13 and 14, the portions 11 and 12 being disposed in laterally offset parallel planes to define guide shoulders 15 and 16. Preferably the measuring guide 10 is made for use with a particular scale 20 in which case the guide shoulders 15 and 16 are of a depth equal to the thickness of the scale 20, such that with the scale seating portion 11 seated on the scale 20 placed on the work, the underside of the guide measuring portion 12, will engage the work.

The measuring guide 10 is made so as to be reversible thus permitting either side to be used and thereby rendering a quick and facile use thereof. In Figure 1, the scale seating portion 11 has the upper side 11a thereof provided with a central serrated zone 17 adapted to be engaged by a finger to permit adjustment of the measuring guide, there being provided a similar serrated zone 17a on the under side 12b of the guide measuring portion 12. The upper side 12a of the guide measuring portion 12 may be provided along the parallel edges 13 and 14 with any suitable scale divisions as shown, similar scale divisions being further provided on the under side 11b of the scale seating portion 11. It is thus seen that the measuring guide 10 is wholly reversible and functions regardless which side is up. Figure 2 shows the measuring guide of Figure 1 reversed, and in this position the portion 12 becomes the scale seating portion and the portion 11 the guide measuring portion.

In use the measuring guide 10 is placed on the scale 20 as shown in Figure 3, the shoulder 15 or 16 depending which side is up siding along the edge 21 of the scale 20. The measuring guide 10 and the scale 20 are held in place by the fingers of the left hand, the measuring guide 10 being preferably held by the middle finger by which it may be moved to adjusted position in the manner readily apparent. When moved to the desired division on the scale, as "a" see Figure 3, it is held in place as indicated, and the division transferred to the work by the drawing of a pencil or scribe along the edge 13 of the measuring guide. Preferably the scale 20 should be provided with graduations or divisions along the other edge thereof corresponding with that along the edge 21, and the length of the seating portion 11 should be such as to ride over said latter divisions, as shown in Figure 3, but less than the width of the scale. This will facilitate easier handling and adjustment of the measuring guide.

Figures 5 and 6 illustrate a modified form of measuring guide 25 for use with a triangular scale 26 as employed by engineers, draftsmen and architects. The measuring guide 25 comprises a scale seating portion 27 having angularly related sides 28, 29 corresponding to the sides of the triangular scale, the side 28 being of less length than the side 29. Extending from the side 29 and integral therewith is a guide measuring portion 30 identical in all respects with the guide measuring portion 12 of the measuring guide 10 of Figures 1–3, and which will lie flat on the work when the measuring guide 25 is placed in position on the scale 26. The side edges 31 and 32 of the measuring guide 25 are parallel and normal to the edges of the triangular scale, see Figure 5.

Both forms of measuring guides are used in an identical manner and when properly placed on their respective scales will not move out of normal relation thereto thus insuring at all times an accurate transfer of a scale division to the work.

Having thus described the invention what is claimed is:

1. The combination with a graduated scale of uniform thickness and provided with parallel ruling edges, of a guide having a graduated portion and a shoulder adapted to have sliding engagement with one of the ruling edges of the scale and another portion adapted to overlie the scale and have sliding engagement with the upper face of the scale, whereby measured marks may be laid out on work at right angles to said ruling edge, said graduated portion being adapted to having sliding contact with the work in the same plane as the bottom face of the scale.

2. A marking guide for machine scales, comprising a member having a straight edge shoulder adapted to have sliding engagement with the ruling edge of a machine scale and having a portion extending laterally of said shoulder to overlie work, said portion having graduations and a ruling edge disposed in right angular relation to the graduations, said member also having another portion extending from and disposed in right angular relation to the shoulder, said last-named portion having graduations thereon, each of said portions having a roughened surface, the roughened surface of the first named portion being adapted to engage the work and the roughened surface of the second-named portion being adapted to be engaged by the finger of the user to aid in shifting the member on the scale.

STEPHEN W. NEDELA.